June 9, 1964

R. S. RICHARDS

METAL COATED REFRACTORIES AND METHOD OF
UTILIZING AND MANUFACTURING SAME 3,136,658

Filed Oct. 4, 1960

*INVENTOR.*
RAYMOND S. RICHARDS

BY
W. A. Schaich and Charles F. Lynch

*ATTORNEYS*

United States Patent Office 3,136,658
Patented June 9, 1964

3,136,658
METAL COATED REFRACTORIES AND METHOD OF UTILIZING AND MANUFACTURING SAME
Raymond S. Richards, Toledo, Ohio, assignor to Owens-Illinois Glass Company, a corporation of Ohio
Filed Oct. 4, 1960, Ser. No. 60,438
19 Claims. (Cl. 117—227)

This invention relates to metal coated refractories and to a method of coating inorganic refractories with metal for the purpose of protecting the refractories against the deleterious effects of molten materials, such as glass, in contact therewith. This invention also relates to the method of handling glass with the novel metal coated refractories of this invention. More specifically, this invention relates to platinum coated refractories employed as resistance elements and heaters and to a method of making the same. In another particular aspect, the invention relates to a method of making a coated refractory electrical resistance heater having variable areas of resistance.

It is common practice in the glass working art to clad the refractory elements of a glass furnace, which are in contact with the molten glass, with a protective metal such as platinum and its allows. A well-known method is to apply shaped sheet platinum to the refractory elements by riveting. However, this has a number of disadvantages including the cost of relatively thick sheets. A more serious disadvantage has been the tendency of the sheet of applied platinum or platinum alloy to fail by creep or by expanding away from the underlying refractory member, thereby exposing the refractory to the corrosive effect of the molten glass. This separation of the sheet platinum from the refractory element has been observed to take place even when the sheet has been riveted or crimped on.

Accordingly, it is an object of this invention to provide a process whereby refractory materials, which are ordinarily seriously damaged at the temperatures of fused glass, are coated with a thin but tenacious and impervious layer of metal which renders the refractory materials highly resistant to the destructive effects of the fused glass. It is a further object of this invention to provide refractories and refractory articles which are resistant to the pitting, dissolving, and corroding action of molten glass in contact therewith. A further object of the present invention is to avoid the present expensive method of cladding refractories exposed to molten glass consisting of riveting platinum sheets to said refractories. A further object of this invention is to provide a more economical method of effectively coating certain refractories with platinum. A further object of this invention is to avoid the disadvantage of present day refractories clad with sheet platinum, which is mechanically riveted on, to peel away from the underlying refractories. A further object is to provide an effective mechanical adherence of platinum or platinum alloys to an underlying refractory substrate. A further object is to provide a method of handling molten glass in which handling equipment is made of platinum coated refractories of the present invention.

A further object of this invention is to provide a process for manufacturing platinum coated resistance elements in which the platinum is intimately and tenaciously interlocked to an underlying ceramic or refractory core.

A further object of this invention is to provide a resistance element consisting of a ceramic or refractory core and an overlying coating of platinum which can be more economically manufactured.

A further object of this invention is to provide a resistance element consisting of a ceramic or refractory core and an overlying coating of platinum which can be more readily repaired and maintained than similar cores clad with platinum foil or sheets.

A further object of this invention is to provide a resistance heater incorporating the aforementioned resistance element.

A further object of this invention is to provide a resistance furnace incorporating the aforementioned resistance heater. These and other objects will become apparent from the description which follows.

A special object of the invention is to provide a method of accurately making an electrical resistance heater or furnace wherein various areas of the heater or furnace have different thicknesses of conductive material and therefore different resistances.

According to the present invention the well-known refractories can be protected from the damaging effect of molten glass in contact therewith by a coating process which comprises spraying a protective layer of molten platinum or its alloys at high velocity onto the refractories.

Moreover, according to the present invention a platinum coated refractory electrical resistance heater, which is admirably suited for use in contact with corrosive fused materials such as glass, is made by first spraying a layer of molten platinum or its alloys on to a refractory base or core to form an electrical resistance element. By attaching electrical connections to the ends of the resistance element so as to form a resistance heater and mounting the same in a suitable refractory container, an electric furnace is thereby obtained in which the resistance element is in direct contact with the material to be fused and yet unaffected by the material due to the inert nature of the platinum and its firm interlocking with the underlying refractory or ceramic base.

The present invention will be better understood by reference to the following drawings in which.

Figure 1:
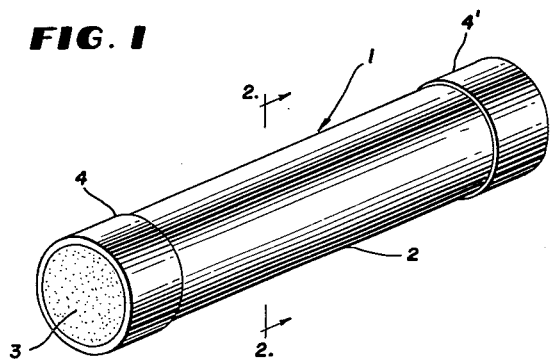
FIGURE 1 is a platinum resistance element made by the process of this invention.
Figure 2:
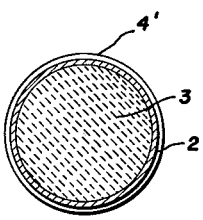
FIGURE 2 is a cross-section of FIGURE 1 taken at 2—2.

In FIGURE 1 there is shown a refractory cylinder 3 which has been spray coated with molten platinum alloy so as to produce two heavier platinum coated terminal areas 4 and 4' and an intermediate lesser platinum coated area 2.

Figure 3:
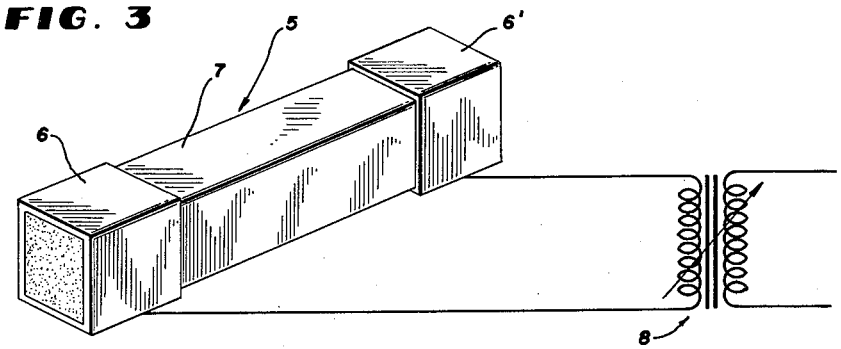
FIGURE 3 is a side view of a resistance heater employing a resistance element of the general type shown in FIGURE 1.

FIGURE 3 is similar to FIGURE 1 except a rectangular bar 5 is employed and the two more heavily platinum coated terminal ends 6 and 6' are connected to a transformer so as to form an electric resistance heater. The intermediate area 7 has a thinner coating of platinum and accordingly has greater electrical resistance than the terminal areas 6 and 6'. Upon connecting bar 5 to a source of electric power 8, more heat or a higher temperature was developed in area 7 than in areas 6 and 6'.

Figure 4:
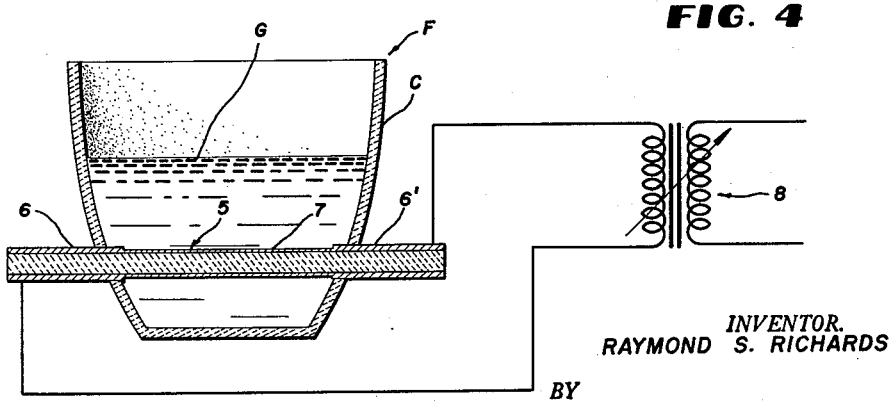
FIGURE 4 is a cross-section of a resistance furnace incorporating the resistance heater of the type shown by FIGURE 3.

FIGURE 4 illustrates a furnace F consisting of the heater of FIGURE 3 which has been mounted in the bottom of a fire resistant ceramic crucible C.

Exemplary of types of refractories contemplated by this invention and which can be coated by a high velocity molten spray of platinum or of platinum alloys include the following: mullite, alumina, zirconia, beryllia, chromite, forsterite, kyanite, fire clay, zircon, magnesia spinel, titania, cassiterite, barium oxide, silica, magnesia, thoria and chromic oxide.

A particular advantage of the invention is that refractories having little or no chemical resistance to molten glass can be employed when coated as described herein, the refractory being chosen mainly on the basis of its resistance to thermal stresses and shocks. Thus, refractories that previously could not be employed in contact with molten glass without high erosion can now be used.

In general, any refractory (a crystalline metal oxide composition which may or may not have a minor portion of vitreous bonding matrix therein) can be coated and employed in the glass handling method of the invention so long as the refractory is not chemically reactive to destroy the coating of platinum at elevated temperatures of use.

The present invention will be more completely understood by reference to the following examples.

*Example I*

A thermocouple protection tube made of Morganite, which is an alumina refractory made by the Morgan Company of England, was coated with sprayed molten platinum to a thickness of 0.020 inch by means of a standard metallizing gun known as a Metco 4–E made by the Metallizing Engineering Company, using velocities of over 200 feet per second. The adherence of the platinum was excellent. The coated tube was put in operation in a furnace handling molten glass and gave excellent performance results in measuring glass temperatures in the furnace tank.

*Example II*

An Owens pot center drain block made of Tamax, which is mullite refractory made by C. Taylor Sons Company of Cincinnati, Ohio, was coated with sprayed molten platinum to a thickness of 0.015 inch by the metallizing gun referred to in Example I above with the same excellent results.

*Example III*

An overflow control block in a feeder from the refiner associated with a glass melting furnace, made of CZ–15, which is a ziron refractory made by C. Taylor and Sons, is coated by spraying with platinum at a velocity above 200 ft. per second with equally satisfactory results as noted in Example II. However, in the present case it is necessary to roughen the surface of the zircon in order to obtain adherence of the platinum.

*Example IV*

A mullite overflow control block in a feeder from the refiner associated with a glass melting furnace was coated in the same manner as in Example III, to a thickness of 0.015 inch using grade 1 M platinum. The block has been in use over four months with no evidence of deterioration.

*Example V*

A tube in a Hartford Empire type feeder from the refiner associated with a glass melting furnace made of Crystallite "CMH–118," which is a mullite made by R.C. Remmy Division of A. P. Green Company, was coated on the inside and outside to a height of 8 inches in the same manner as in Example I, and gave the same excellent performance results in use as noted with Example I above.

*Example VI*

A Danner sleeve (a refractory sleeve or mandrel used in the Danner process of making glass tubing) was coated with platinum by spraying with a wire spraying gun at velocities of over 200 feet per second over a length of 15 inches to a thickness of 0.05 inch. This sleeve was put into service making glass tubing and has been in continuous service for nearly five weeks without any detectable erosion having occurred. Normally, such a sleeve not coated has a life of four to five weeks with gross erosion of the sleeve.

The manner in which resistance elements, heaters, and furnaces can be made is illustrated by the following examples:

*Example VII*

A metallized platinum resistance heating element was made by spraying an A–10 ceramic bar (a refractory made by the Babcock and Wilcox Co., Refractories Division, Augusta, Ga.) one-half inch square and eight inches long with molten platinum (10% rhodium) wire in the manner described in connection with FIGURE 3 above. Electrical connections were then made to the two ends of the bar to a 50 kva. A.C. transformer and power slowly applied up to a setting of 1.5 volts and 200 amperes. A piece of ¼ inch soda lime glass rod brought in contact with the bar was immediately melted.

*Example VIII*

A resistance heater furnace (see FIGURE 4) employing the above element was made by drilling two square holes opposite each other and immediately above the bottom of a mullite crucible measuring 3⅜" O.D. so as to allow a slip fit of the element. Electrical connections were made to the ends of the element, and a source of power consisting of a 50 kva. A.C. transformer controlled by a Variac. The power was then brought up slowly to 1.5 volts and 200 amperes. The crucible was filled with ½ pound of soda lime glass rod which entirely melted in about one minute. An optical pyrometer reading was taken at this time, and the temperature at the hot end of the heater was 1645° F. while the cold end of the heater was 1600° F. These differences in temperatures were due to the hotter portion 7 being coated with a thinner layer of platinum than the cooler end 6. In other words the thinner layer of platinum has greater resistance and, therefore, produces greater heat. These temperatures were then maintained for 38 hours.

The resistance heater described above is merely by way of illustration and it is obvious that refractories other than mullite could be employed and that the furnace itself could assume sizes, shapes, and forms other than a crucible. Numerous other modifications can be employed with the present invention as will be suggested to those familiar with the art.

The above examples are merely by way of illustration and it is obvious that any of the well known refractories can be coated provided the metal is in a molten state and is sprayed on at a high velocity.

The thickness of the sprayed on molten platinum or platinum alloy is a matter of choice depending upon the use to which the finished article is to be put, but thicknesses of 0.005 inch to 0.08 inch and greater have proven satisfactory.

The novel process of this invention is of general application with respect to platinum and its alloys. Accordingly, platinum alloys containing rhodium, nickel, gold, iridium, palladium, and the like can be utilized in the present invention provided that the platinum is at least 80 percent of the alloy. Applicable platinum alloys are well known in the art and are disclosed in U.S. Patents 2,031,083, 2,361,578, and others.

With regard to the metal spraying step, the molten metal can be sprayed on by means of a spray gun of the Schoop type is which the metal is fed in the form of a wire and melted either electrically or by means of a gas such as an oxygen-acetylene flame, as is well known in the art. The gaseous pressure for spraying the molten metal can be applied by air or other gas, such as argon or helium. The gas can be preheated, if desired, and the spraying may be done in air or under non-oxidizing conditions. Instead of a spray gun tank means can be employed which are also well known in the art as illustrated by U.S. Patent 1,164,008. In general, any spraying apparatus can be used which delivers the metal in a molten state at a high velocity. Velocities are usually at least 100 feet per second, more usually at least 200 feet per second. Whether a spray gun, as in the examples above, a tank, or another spraying process is used, the process is continued until the desired thickness of molten metal is deposited.

It is to be understood that any glass furnace element which has surfaces accessible by spraying can be coated by the novel process of this invention and that other elements which have been protectively sprayed by molten platinum and its alloys include feeder rotors, needles, and also furnace walls in contact with glass, besides those enumerated above. It is to be noted that the present process is particularly suited to the making of resistance heating elements of complex and involved configuration provided the surfaces are accessible for the purpose of applying the platinum or platinum alloy as a spray.

In certain instances it is found necessary to roughen the surface of the refractory, particularly when the refractory is hard and presents a smooth surface as in the case of some varieties of zircon. This roughening can be accomplished by mechanical or chemical means in order that there will be a roughened surface to which the sprayed molten metal can adhere. In addition, it is necessary that the molten metal be sprayed with sufficient velocity against the porous or roughened surface of the refractory being coated so that adherence will occur. The importance of this is illustrated by the fact that certain refractories when dipped in molten platinum or platinum alloys are not wetted by the molten metal and no adherence takes place such that the refractories come out clean and uncoated. Thus, in order to obtain the tenacious bond, the crystalline refractory composition must have some porosity or it must be roughened, so that it has an irregular surface. Also, the velocity of spraying must be at least 100 feet per second. While the reason for the extremely tenacious bond between the refractory and the platinum coating is not definitely known, the coating so formed is much more tenacious than a coating formed by dipping the refractory in molten platinum; in fact, a coating usually cannot be formed. The tenaciousness of the present coating may be due in part to partial diffusion of the metal into the refractory, in part to chemical attractive forces, or in part to a mechanical interlocking, or to a number of factors. In any case, a vastly superior product is produced if the conditions of preparation are observed. The bonding is believed to be in part mechanical because of the necessity for using a porous or roughened refractory.

From the foregoing description it will be apparent that there has been devised a method of preparing platinum or platinum alloy coated refractories wherein said refractories find tremendous applicability in the glass art due to their resistance to corrosion by molten glass in contact therewith. There has been devised a new and superior method of handling glass, as well as new platinum coated refractories.

A particular embodiment of the invention is a method of preparing a resistance heating element having different resistances in different areas so that the heater can maintain different temperatures at different localized areas thereof. This is accomplished by spraying a coating of a conductive material on at least a portion of a crystalline metal oxide refractory base, as described hereinbefore, but spraying different amounts of the conductive material per unit at different localized areas so as to roughly obtain the heating distribution desired when a current is passed through the coating. Thereafter electrical contacts are attached and electrical current is passed through the heater. Temperatures at various points on the surface of the heater are checked by thermocouples or other means, and the coating is then built up by further spray application of conductive material on areas which are too thin as shown by the temperature testing. A simple example of the method is the preparation of the element of FIGURE 1 by this multi-step method. It will be understood, of course, that much more complex heating elements with a multiplicity of temperature zones can be simply and accurately prepared by this method.

This particular step-wise method is applicable not only to the platinum metal and platinum alloys described as the conductive material, but to other suitable conductive resistance heating materials as well. It applies to such metals in general, in the form of elemental metals, alloys of metals and inorganic metal compounds, sprayed in the molten state as previously described with respect to platinum. Examples are nickel alloys (e.g., 66% Ni, 22% Cr, 12% Fe and 80% Ni, 20% Cr), molybdenum silicide, chromium alloys (e.g., 23.4% Cr, 6.2% Al, 1.9% Co, 0.06% C, balance Fe and 20% Cr, 3% Al, balance Ni), copper-nickel alloys (e.g. 55% Cu, 45% Ni), and 75% Ni, 20% Cr, 2% Al, 3% Cu.

By electrically conductive inorganic metal material, as used in the claims, is meant conductive elemental metals, metal alloys and inorganic metal compounds.

This application is a continuation-in-part of Serial No. 860,732, filed December 21, 1959, now abandoned.

I claim:

1. A metal coated refractory comprising a refractory substrate containing a strongly adherent continuous coating of metal directly on said substrate, said refractory being a crystalline metal oxide composition, said coating of metal having been applied by spraying molten metal directly onto the surface of the refractory at a velocity of at least 100 feet per second, said metal being selected from the group consisting of platinum and platinum alloys containing at least 80 percent platinum.

2. A coated refractory of claim 1 wherein said refractory is selected from a group consisting of mullite, alumina, zirconia, beryllia, chromite, forsterite, kyanite, fire clay, zircon, magnesia spinel, titania, cassiterite, barium oxide, silica, magnesia, thoria and chromic oxide.

3. The coated refractory of claim 2 in which the refractory is mullite and the metal is platinum.

4. The coated refractory of claim 2 in which the refractory is alumina and the metal is platinum.

5. The coated refractory of claim 2 in which the refractory is zircon and the metal is platinum.

6. The coated refractory of claim 2 in which the refractory is mullite and the metal is a platinum alloy containing at least 80 percent platinum.

7. The coated refractory of claim 2 in which the refractory is alumina and the metal is a platinum alloy containing at least 80 percent platinum.

8. A method of coating a refractory metal oxide material which comes into contact with molten glass with a continuous, strongly adhering metal coating thereby rendering the refractory metal oxide material resistant to corrosion and erosion by molten glass, which method comprises spraying a molten metal, selected from the group consisting of (a) platinum and (b) platinum alloys containing at least 80 percent platinum, directly onto the surface of said refractory metal oxide at a velocity of at least 100 feet per second.

9. A method of claim 8 wherein said refractory metal oxide is selected from the group consisting of mullite, alumina, zirconia, beryllia, chromite, forsterite, kyanite, fire clay, zircon, magnesia spinel, titania, cassiterite, barium oxide, silica, magnesia, thoria and chromic oxide.

10. The method of claim 9 in which the metal is a platinum alloy containing at least 80 percent platinum.

11. The method of claim 8 in which the refractory is mullite and the metal is platinum.

12. The method of claim 11 in which the metal is a platinum alloy containing at least 80 percent platinum.

13. The method of claim 8 in which the refractory is alumina and the metal is platinum.

14. The method of claim 8 in which the refractory is zircon and the metal is platinum.

15. An electrical resistance heating element consisting of a crystalline metal oxide refractory core having a continuous coating thereon of a metal which is selected from the group consisting of (a) platinum and (b) platinum alloys containing at least 80% platinum and which is applied directly onto said refractory core as a molten spray having a velocity of at least 100 feet per second.

16. In an electrical resistance heater having electrical connections attached to an electrical resistance element with a crystalline metal oxide refractory core, the improvement consisting of making said element by spraying the refractory core directly with a molten metal selected from the group consisting of (a) platinum and (b) platinum alloys containing at least 80 percent platinum at a velocity of at least 100 feet per second so as to form a continuous coating intimately bonded with the ceramic core.

17. A method of making an electrical resistance heating element comprising spraying a molten metal selected from the group consisting of (a) platinum and (b) platinum alloys containing at least 80 percent platinum directly on a crystalline metal oxide refractory core at a velocity of at least 100 feet per second to form a continuous coating on said refractory core.

18. A method of making an electrical resistance heater having two ends thereto comprising spraying a molten metal selected from the group consisting of (a) platinum and (b) platinum alloys containing at least 80 percent platinum directly on a crystalline metal oxide refractory core at a velocity of at least 100 feet per second to form a continuous coating on said refractory core, and attaching electrical connectors to the ends of said heater.

19. In a method of making an electrical resistance heater comprising a coating of an electrically conductive inorganic metal material which is resistant to corrosion by molten glass on at least a portion of a refractory of the crystalline metal oxide type, the steps which comprise applying the coating of said metal onto said refractory by spraying said metal material in a molten state directly onto said refractory so as to obtain a continuous coating having approximately the desired thickness distribution in various areas of the heater so as to obtain approximately a desired heat output distribution by thus controlling the resistance at various given areas of the heater, attaching electrical leads to said coating and passing current therethrough, measuring the temperature at various areas of the heater and thereafter depositing more of said metal material by spraying on areas having too much resistance and thus having a higher temperature than desired, thus forming an electrical resistance heater element of the desired heat output distribution.

References Cited in the file of this patent

UNITED STATES PATENTS

| | | |
|---|---|---|
| 1,682,457 | Zworykin | Aug. 28, 1928 |
| 2,195,436 | Weller | Apr. 2, 1940 |
| 2,777,254 | Siefert et al. | Jan. 15, 1957 |

FOREIGN PATENTS

| | | |
|---|---|---|
| 640,323 | Great Britain | July 19, 1950 |

OTHER REFERENCES

Ballard: Metal Spraying and Sprayed Metal, 1948, 3rd Ed., Charles Griffin & Co. Ltd., London, pp. 182–183.